United States Patent [19]

Schwabenlender

[11] 3,734,554

[45] May 22, 1973

[54] LOW IMPACT PROTECTION SYSTEM FOR VEHICLES

[75] Inventor: Carl W. Schwabenlender, Milwaukee, Wis.

[73] Assignee: A. O. Smith Corporation, Milwaukee, Wis.

[22] Filed: Feb. 22, 1971

[21] Appl. No.: 117,469

[52] U.S. Cl. ................................293/88, 267/63 A
[51] Int. Cl. .................................................B60r 19/06
[58] Field of Search ....................293/60, 63, 70, 85, 293/88, 99, 101; 267/63 A, 140, 139

[56] References Cited

UNITED STATES PATENTS

| | | | |
|---|---|---|---|
| 2,036,361 | 4/1936 | Sann et al. | 213/9 |
| 3,494,607 | 2/1970 | Rusch | 267/1 |
| 1,810,717 | 6/1931 | Lord | 293/88 X |
| 3,457,729 | 7/1969 | Wanneroy | 61/48 |

FOREIGN PATENTS OR APPLICATIONS

| | | | |
|---|---|---|---|
| 195,289 | 3/1923 | Great Britain | 293/63 |
| 1,077,922 | 3/1960 | Germany | 267/63 A |
| 551,334 | 2/1943 | Great Britain | 293/88 |

*Primary Examiner*—Robert G. Sheridan
*Assistant Examiner*—Robert Saifer
*Attorney*—Andrus, Sceales, Starke & Sawall

[57] ABSTRACT

An impact absorbing system includes a bumper having a resilient coating, and shear mounts between the bumper and the vehicle frame side bars. The ends of the side bars are strengthened and are offset outwardly from the wheel wells to near the ends of the bumpers where the shear mounts connect the bumper to the frame. Each shear mount includes an upper and lower bracket fixed to the bumper and bonded to resilient blocks supported on an inner bracket which is bolted to the frame side bar. A rim on the inner bracket and corresponding flanges on the upper and lower brackets abut to hold the resilient blocks in a normally stressed condition.

3 Claims, 4 Drawing Figures

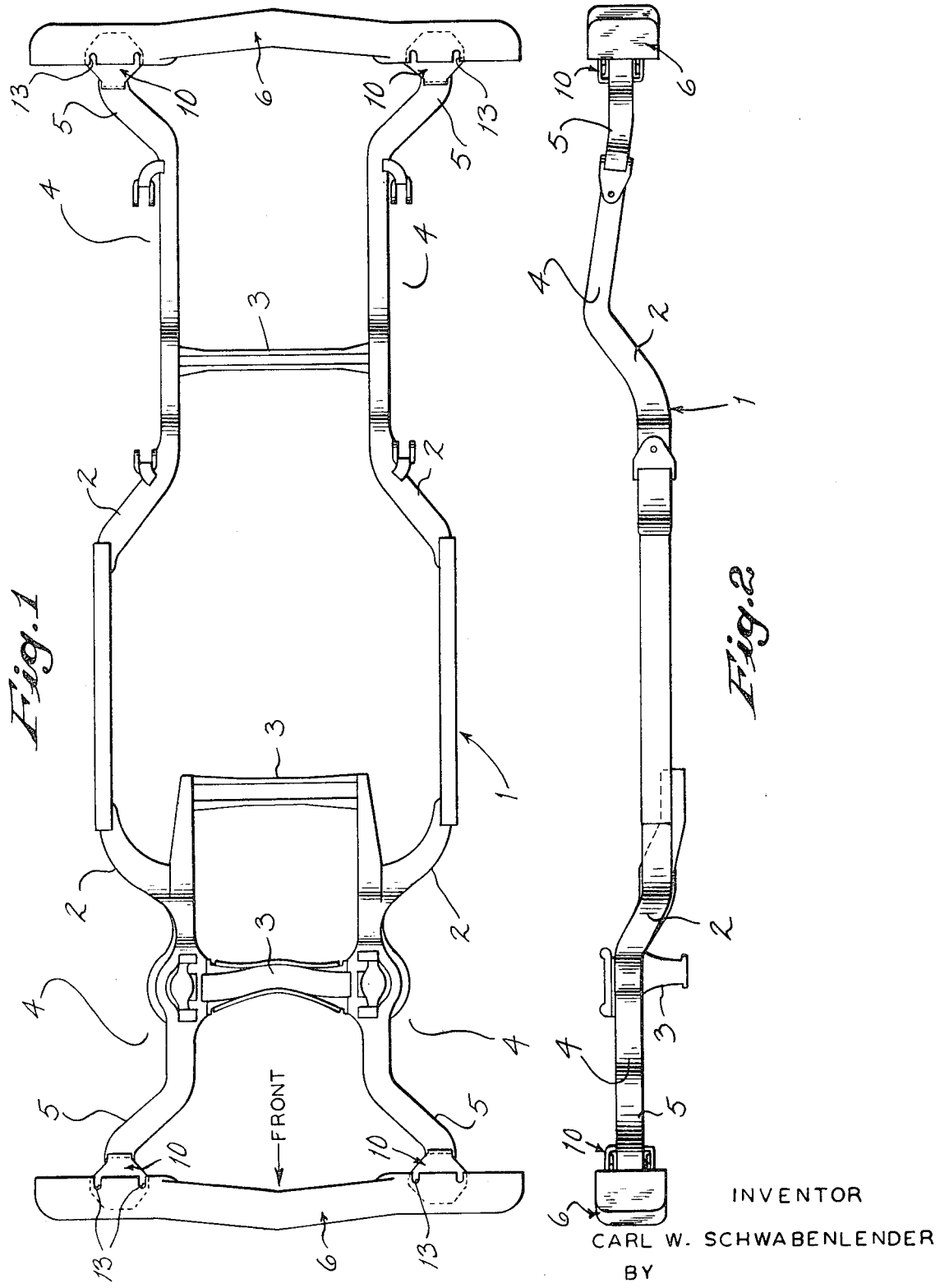

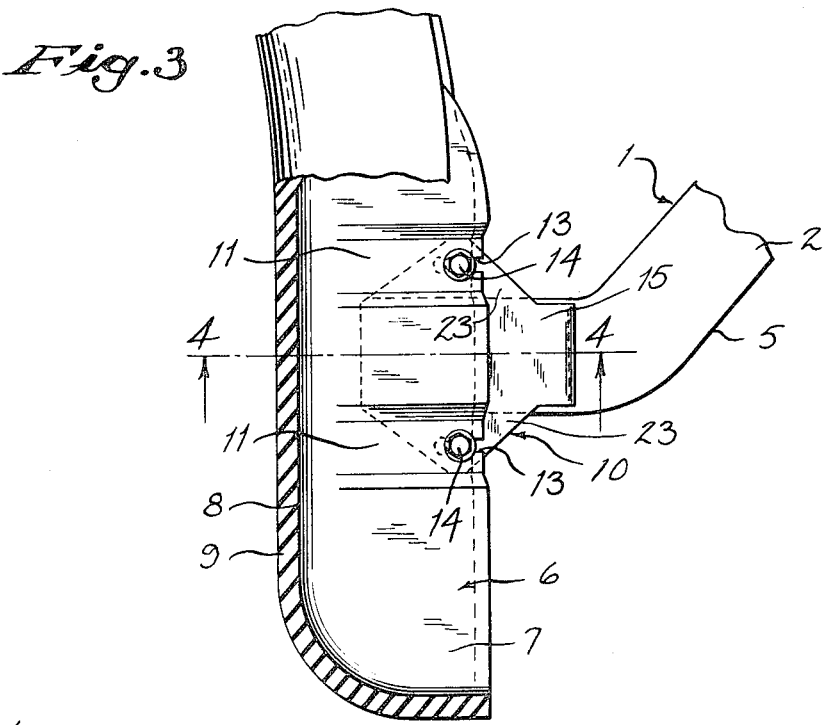
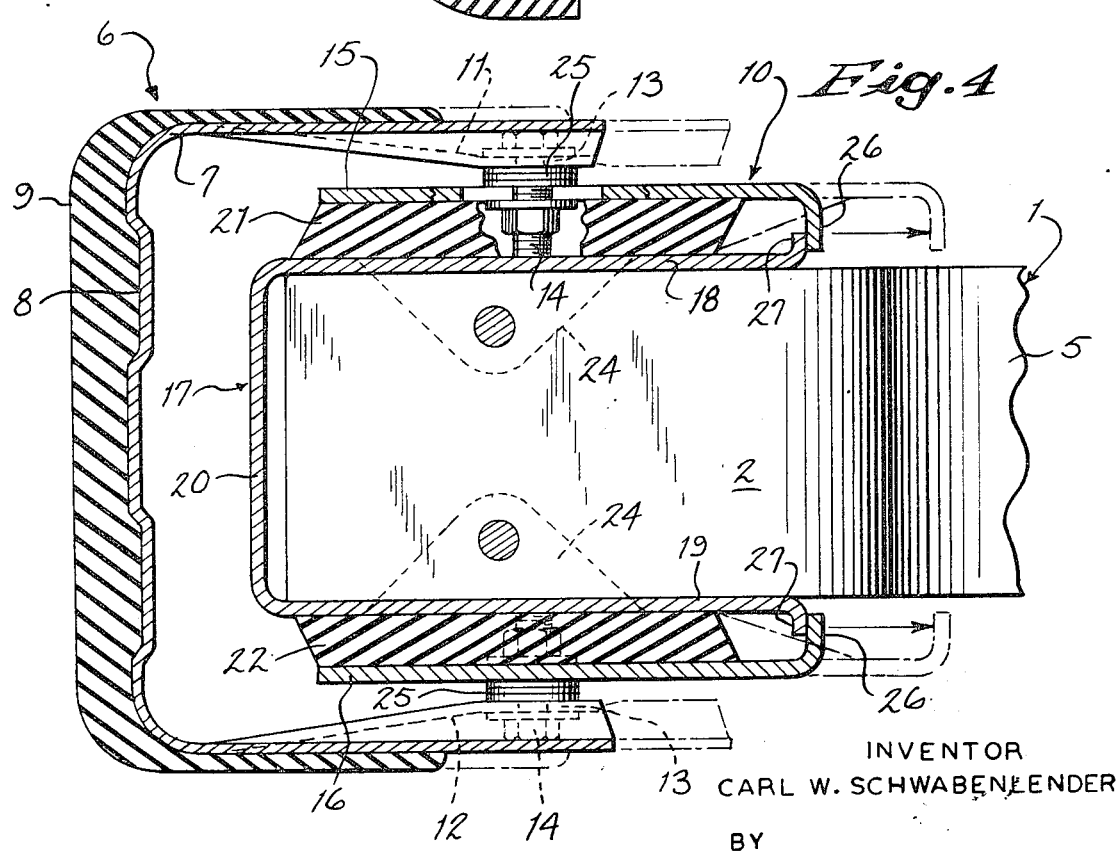

LOW IMPACT PROTECTION SYSTEM FOR VEHICLES

BACKGROUND OF THE INVENTION

This invention relates to energy absorbing systems for vehicle bumpers, frames and mounts, and more particularly to low speed impact absorbing systems.

Present bumpers on automotive vehicles serve little more than decorative purposes and easily scratch, dent or bend even on low impacts at collisions of 5–10 miles per hour and less. For this reason, there is rising demand for energy absorbing systems that can protect against low speed impacts with no consequent damage to the bumper or vehicle.

There have been many prior bumper devices intended to absorb low energy impacts. None have been developed to the extent to which it would be practical or economical to replace the conventional bumper systems, or otherwise the devices would not meet the energy absorbing needs sufficiently to provide the desired protection. For instance, energy absorbing cushions secured to the exterior of the bumper have been tried, but they are generally found inadequate in any practical design.

Shock absorber mountings between the bumper and vehicle have also been designed. Examples are the devices shown in U.S. Pat. No. 1,810,717 to Lord and U.S. Pat. No. 1,602,922 to Midboe. These and similar structures are either not fully effective or impractical or both. Some such devices employ cushion mountings which are intended to absorb the energy of impact by permitting deflection of the bumper. To provide the needed amount of energy absorption, however, such devices require large deflection, because the cushions are not effectively utilized in their mounting arrangements. When the bumper systems are designed for large deflections, the mounts and bumpers become unstable, the bumpers extend awkwardly outward from the frame, and the systems extensively rearrange the styling of the vehicle front end and rear. Thus, such devices are presently uneconomical and impractical, and have not found general acceptance by manufacturers even in the face of rising demand.

Further, the mounting arrangements of prior devices do not provide rigidity where it is needed. Such bumpers are easily extended outward of their frames, or may be easily forced upwardly and downwardly about their mounts. This causes problems in towing, in particular, and the vehicle cannot be jacked up by jacking on the bumper.

These problems and others have caused failure to respond to the demand for protection from low speed impacts acting on vehicle bumpers.

SUMMARY OF THE INVENTION

The invention provides an impact absorption system for a vehicle that is effective to absorb low speed impacts without damage to the system or the vehicle. The system of the invention avoids the above mentioned problems of prior devices and has other advantages as will appear in the drawings and description.

The system of the invention includes a particularly advantageous feature in a shear-shock mount device for a vehicle bumper. The shear mount includes one or more resilient blocks which are mounted by a bracket arrangement between the bumper and the vehicle frame side bar. The mount arrangement maximizes impact absorption while minimizing the degree of deflection. In this assembly, the bumper can thus be mounted to the vehicle frame without extending outwardly much more than the conventional bumper would. The assembly further provides a stable bumper connection near the center of gravity of the bumper to avoid bumper bounce during vehicle travel, and to permit jacking of the car by supporting the jack on the bumper. Also due to the mount arrangement, no substantial redesign of the vehicle body style is required. These and other features of the shear mount device of the invention accomplish an economical, practical and commercially feasible low speed impact absorbing bumper mount.

The invention further contemplates a total system approach that provides maximum protection from damage at low speed impacts. The shear-shock mount is a key element in the total system, while a combination of the invention includes a bumper having a resilient coating that disperses low impact, localized loads to a larger bumper area and avoids localized denting of the bumper. The coating further protects from scratching of the bumper.

Another combination in the total system approach of the invention includes an offset design for the end of the vehicle frame side bar. The side bar is strengthened at this end and with the offset is capable of deflecting to a greater degree so as to absorb energy without damage to the vehicle. The offset design disposes the bumper end of the side bar laterally outward of the side bar so that the bumper is mounted on this end and will be better supported during impacts centered toward the outside ends of the bumper. Bending of the bumper is thus minimized during impacts.

A preferred and further advantageous feature of the shear-shock mount includes stop means incorporated in the bracket arrangement. The stop means restricts outward extension of the bumper and facilitates the stability of the device, particularly where it is desired to tow the vehicle by use of the bumper.

In the optimum design of this feature of the invention, the bracket arrangement confines the resilient blocks in a pre-stressed condition. This further maximizes impact absorption while minimizing the required deflection of the mount.

Another feature of the invention is the provision, through a system of slotted holes and shims, for full dimensional adjustability in mounting of the bumpers to the vehicle. This feature is advantageous in obtaining match-up of bumpers to body, to enhance the appearance of the vehicle.

In the optimum total system of the invention, all elements of the system are incorporated, including the resiliently coated bumper, the shear-shock mount and the off-set end frame features. This system provides impact absorption without damage for impacts at speeds into the 5–10 mph range.

DRAWINGS

The drawings illustrate the best mode presently contemplated by the inventor for carrying out the invention.

In the drawings:

FIG. 1 is a top plan view of a vehicle frame and bumper according to the invention;

FIG. 2 is a side elevational view of the structure in FIG. 1;

FIG. 3 is an enlarged top plan view of the bumper mount of the invention; and

FIG. 4 is a side elevational view of the structure shown in FIG. 3 with parts in section, and an impact stressed condition shown in phantom.

DESCRIPTION

Referring to the drawings and particularly to FIGS. 1 and 2, a vehicle frame 1 has the generally conventional side bars 2 and cross bars 3, which can consist of channel members. As in the usual frame, parts of side bars 2 may be in a box-like configuration, or double channel members, and may be single channels. Side bars 2 curve inwardly toward the front and rear to form the usual wheel well portions 4.

In accordance with the invention, the front end of the frame has side bars 2 extending laterally outward from wheel well portions 4 to form offset portions 5. Offset portions 5 curve back to longitudinal alignment with the frame at the end of the side bars 2. The offset permits a degree of deflection of the side bar in the area of offset portion 5, and thus front end impacts are partially absorbed. For this purpose, the side bars are strengthened at the offset portions to better absorb the energy of impact without permanently deforming the frame. Thus, impact strength is provided mainly by the frame so that there is no adverse affect on the body sheet metal, not shown, that is conventionally mounted to the frame through resilient isolators. The curvature of the offset as well as the width of the side bar and the thickness of the steel at the offset determine the amount of deflection in any particular design. A front end impact will force the front end of the side bar backward. At offset portion 5, the side bar will bend somewhat at the curved portion near wheel well 4 to force inward a small degree the portion of the side bar from wheel wells 4 and toward the rear. In this bending process, some energy of impact is absorbed, and on low speed impacts, no permanent deformation will be experienced.

Similar offset portions 5 may be provided at the rear of frame 1 and will not be described particularly here.

The bumpers 6 of the invention are mounted on the front and rear ends of the offset portions 5 of side bars 2. Because of the offset design of the ends of the side bars, a relatively small part of the bumper extends laterally outward from the frame. Outside impacts on the bumper therefore act through a relatively short moment arm to the mounting, reducing the bending moments on the bumper to further decrease possible damage on low speed impacts.

Bumpers 6 may be of any conventional configuration, formed mainly of steel channel members 7 extending across the front and rear of frame 1, with the web portions 8 of the channel disposed to the outside. In accordance with the invention, the channel member should be of sufficient size and strength to resist low speed impact bending forces, and at least web portions 8 are covered with a resilient coating 9 on their outside surfaces. The other outside surfaces may also be coated, although for purposes of the invention, this would not be necessary.

Coating 9 may be any sort of durable, resilient material, such as rubber, neoprene, polyurethane and the like, which is cast or bonded by a suitable epoxy cement or the like to the surfaces of webs 8. The purpose of the coating is not to absorb any large percentage of the energy of all low speed impacts, but rather to disperse the load of the impacts to a larger area of the bumper and avoid localized denting and scratching. For this function and depending on the material used, coating 9 should have appreciable thickness and should be capable of deflecting an amount to properly disperse the load of low speed impacts and avoid damage to the bumper.

Further absorption of impact loads is provided by the bumper mounting to side bars 2. In accordance with the invention, four shear-shock bumper mounts 10 serve as the attachments between bumpers 6 and the ends of side bars 2 beyond offset portions 5. The mounting arrangement permits the horizontal legs of the bumper channel members 7 to straddle the ends of side bars 2, thus mounting bumpers 6 on the side bars near the lengthwise center of gravity line of the bumper. This tends to stabilize the bumpers and further reduces the moment arm from the underside of the bumper mounting which facilitates jacking.

Referring particularly to FIGS. 3 and 4, each shear mount 10 is the same and only one will be described in detail. At a mount 10, the upper flange bumper channel 7 has a pair of inward convolutions 11 stamped in the bumper to both sides of the side bar 2. The lower flange of bumper 6 has a pair of similar inward convolutions 12. At the inside edge of each convolution, a slot 13 is stamped in the bumper and each receives a bolt 14 of a bolt assembly that connects to mount 10. The orientation of slots 13 allows forward and backward adjustability of bumper 6.

Mount 10 includes an upper mounting bracket 15 and a lower mounting bracket 16 which are mounted by bolts 14 to the bumper and extend over the upper and lower surfaces at the end of side bar 2. Within brackets 15 and 16, mount 10 has an inner bracket 17 straddling the end of the side bars with an end plate 20. Between bracket 15 and upper plate 18, an upper resilient block 21 is bonded, and a similar, lower resilient block 22 is fixed between bracket 16 and plate 19. Bolts 14 are mounted to the sides of blocks 21 and 22, and for that purpose brackets 15 and 16 have horizontal ears 23 on each side to meet the bolts. Bracket ears 23 have slots corresponding in position to slots 13 to receive bolts 14 and permit inboard and outboard adjustability in mounting bumper 6. The main portion of each mounting bracket 15 and 16 is generally the same width of the side bar channel and lies contiguously with the corresponding resilient block, which is rectangular and also of the same width, to lie contiguously with the corresponding top or bottom plate of inner bracket 17.

Inner bracket 17 is bolted to the side bar. For this purpose, ears 24 may be provided from the edges of flat plates 18 and 19 to extend over the web portion of side bar 2 where they are bolted. The bumpers are by this means mounted on the ends of side bars 2.

Nuts and washers around the shanks of bolts 14 lock bumper flanges 7 to the ears 23 of mounting brackets 15 and 16 through shim packs 25. Variation in the number of shims used allows up and down adjustability of bumper 6. With the resilient blocks fixed between upper and lower mounting brackets 15 and 16 and the corresponding plates 18 and 19 of inner bracket 17, the mounting arrangement will permit deflection of a bumper 6 relative to the frame side bars 2. The amount of deflection is governed by the characteristics of blocks 21 and 22.

In accordance with the invention, the size and resiliency of each resilient block should be sufficient to permit a deflection longitudinally of the side bar, and sufficient to absorb much of the impact energy for speeds up to 5-10 mph. Natural rubber or similar synthetic material is the preferred material. The blocks, in accordance with the mounting and bracket arrangement of the invention, absorb the energy of impact in shear and the shear stress is generally equally distributed throughout the rectangular block. In this way, the rubber blocks are utilized to full effectiveness, providing maximum energy absorption with minimum deflection. Further, the blocks are stiff in compression to further stabilize the system.

In the most advantageous form of the invention, resilient blocks 21 and 22 are pre-stressed in the shear direction to further minimize the deflection of shear mount 10. For this function, upper and lower mounting brackets 15 and 16 have inwardly projecting flanges 26 which extend from the inside end of the brackets toward side bar 2. Flanges 26 engage corresponding outwardly extending rims 27 of plates 18 and 19 of the inner bracket to pre-stress resilient blocks 21 and 22 in the direction of shear which would be experienced during an impact on the bumper 6. A further function of the flange and rim structure is to serve as a limiting stop member, that restricts deflection of mount 10 outward of the end of side bar 2. This is a particularly advantageous feature when it is desired to hook up to the bumper for towing the vehicle.

In operation, such as during a low speed front end collision, the impact is carried from front bumper 6 to shear mounts 10, which deflect in the shear direction, as shown in phantom in FIG. 4 to absorb energy of the impact. If the impact is great enough, the energy transferred to side bars 2 by shear mounts 10 deflects side bars 2 through the offset portions 5, absorbing more of the impact. In low speed impacts, the energy is fully absorbed with no damage to the bumper or frame, and the resiliency of the deflecting parts return the bumper, mount and frame to their pre-collision conditions.

As an example of the practice of the invention, a system designed for a typical 4,000 pound vehicle experiencing an impact on its center line at 5-10 mph could safely absorb the impact without damage if the total impact absorbing system deflected approximately 5 inches. The shear shock device could be designed of proper thickness to deflect about 3 inches and absorb 60 percent of the kinetic energy of impact. The body, mounts and offset frame, in this example, are designed to deflect a total of about 1.5 inches and absorb another 30 percent. The bumper with resilient coating would then absorb 10 percent of the energy with about a 0.5 inch deflection.

The invention thus provides practical and commercially feasible protection against damage in low speed collisions, while avoiding instability and unsightly overhang in the bumper-vehicle body design.

Various modes of carrying out the invention are contemplated as being within the scope of the following claims which particularly point out and distinctly claim the subject matter which is regarded as the invention.

I claim:

1. In a vehicle bumper mount for mounting a vehicle bumper to the end of the side bar of a vehicle frame, mounting bracket means straddling an end of the side bar, said bracket means comprising an upper plate extending longitudinally over the upper surface of the side bar and a lower plate extending over the lower surface of the side bar with plate means joining said upper and lower plates at the outer end of the side bar, an upper bracket mounted on the upper side of the side bar over the upper plate of the bracket means and in vertically spaced relation therefrom, a lower bracket mounted on the underside of the side bar below the lower plate of the bracket means and in vertically spaced relation therefrom, a block of resilient material secured between the upper plate and upper bracket and a corresponding block of resilient material secured between the lower plate and lower bracket, the blocks of resilient material stressing in shear between the mounting bracket means and side bar during impact forcing the bumper toward the side bar, means securing the mounting bracket means to the end portion of the side bar and to the vehicle bumper, and stop means on bumper mount for cooperating with the at least one of said plates to restrict deflection of said resilient blocks in the direction forcing the bumper outward from the end of the side bar and stressing said resilient blocks in shear in the direction forcing the bumper toward the end of the side bar.

2. The apparatus of claim 1, wherein the stop means comprises complementary flanges on at least one of the mounting brackets and one adjacent mounting plate at the ends farthest from the front of the bumper with one of said flanges located inside the other whereby deflection of at least one of said resilient blocks is restricted in the direction forcing the bumper away from the end of the side bar.

3. The apparatus of claim 1, wherein the stop means comprises an inwardly projecting flange at the end of each bracket farthest from the front of the bumper, said flange extending toward a said longitudinally extending plate, and an outwardly projecting rim on each longitudinally extending plate cooperating with a respective flange.

* * * * *